United States Patent [19]

Raj et al.

[11] 4,407,508

[45] Oct. 4, 1983

[54] SINGLE-POLE-PIECE FERROFLUID SEAL APPARATUS AND EXCLUSION SEAL SYSTEM

[75] Inventors: Kuldip Raj, Merrimack; Raoul Casciari, Bedford, both of N.H.

[73] Assignee: Ferrofluidics Corporation, Nashua, N.H.

[21] Appl. No.: 450,339

[22] Filed: Dec. 16, 1982

[51] Int. Cl.$^3$ .............................................. F16J 15/40
[52] U.S. Cl. ........................................ 277/1; 277/80; 277/135
[58] Field of Search ............... 277/1, 80, 135, DIG. 7, 277/DIG. 8

[56] References Cited

U.S. PATENT DOCUMENTS

| | | | |
|---|---|---|---|
| 2,996,162 | 8/1961 | Lehde | 277/80 X |
| 3,620,584 | 11/1971 | Rosenzweig | 277/80 X |
| 3,814,443 | 6/1974 | Steigerwald | 277/80 X |
| 4,171,818 | 10/1979 | Moskowitz et al. | 277/80 |
| 4,335,885 | 6/1982 | Heshmat | 277/80 X |
| 4,357,023 | 11/1982 | Yamamura | 277/80 X |

FOREIGN PATENT DOCUMENTS

| | | | |
|---|---|---|---|
| 54-108161 | 8/1979 | Japan | 277/80 |
| 655858 | 4/1979 | U.S.S.R. | 277/80 |
| 781469 | 11/1980 | U.S.S.R. | 277/80 |

Primary Examiner—Robert S. Ward, Jr.
Attorney, Agent, or Firm—Richard P. Crowley

[57] ABSTRACT

A single-pole-piece ferrofluid exclusion seal apparatus and exclusion seal system which comprises a single, annular pole piece to surround a shaft element to be sealed, and an annular permanent magnet secured to one surface of the pole piece in a magnetic-flux relationship, the single pole piece having a one end which extends into a close, noncontacting relationship with the surface of the shaft element to be sealed, to define a small radial gap between the surface of the shaft element and the one end of the pole piece, and a ferrofluid positioned within the radial gap, to provide a ferrofluid seal with the shaft element, the ferrofluid comprising a high magnetization-type ferrofluid, with the magnetic flux path of the single-pole-piece ferrofluid seal extending between the shaft, the ferrofluid in the radial gap, the single pole piece in the permanent magnet and the air gap between the magnet and the shaft.

13 Claims, 3 Drawing Figures

SINGLE-POLE-PIECE FERROFLUID SEAL APPARATUS AND EXCLUSION SEAL SYSTEM

BACKGROUND OF THE INVENTION

Dual-stage-pole-piece and multiple-stage-pole-piece ferrofluid or magnetic seal apparatuses are well known and are designed to provide a seal typically about a rotatable shaft between two different environments, such as high- and low-pressure environments, for multiple-stage ferrofluid seals, or to provide an exclusion seal to exclude one environment from altering another environment. In a ferrofluid exclusion seal, the function of the ferrofluid seal is to exclude contaminants from reaching a sensitive part of a device or an environment protected by the seal. Typically, such exclusion seals are not required to provide any particular pressure capacity between environments of high and low pressure. Examples of the use of typical exclusion seals are the use of dual pole-piece ferrofluid seals with computer-disc-drive spindles, in order to prevent particulate contaminants from reaching or contacting the memory disc area of the computer and wiping out or affecting the stored memory, the sealing of motor shafts or textile spindles in the textile industry to prevent spindle or motor-bearing failings caused by fibrous materials, and to protect sensitive instruments from undesirable environments, such as from salt-spray mist in ocean environments or prevent corrosive chemical environments from reaching sensitive equipment. In such exclusion ferrofluid seal applications, the pressure capacity required for the ferrofluid exclusion seal is normally very small, and typically, for example, about 0.5 of a pound or less.

Ferrofluid-sealing technology is well known with the use of ferrofluid-type exclusion seals. The typical design of the exclusion seal consists of a permanent magnet and two magnetic permeable pole pieces, with the magnetic-flux circuit completed through the magnetically permeable shaft, which is usually provided by the seal customer. If desired, each pole piece may consist of one or more stages, in order to increase the pressure capacity of the seals and, thus, form a multiple-stage exclusion pressure-type seal, such as described in U.S. Pat. No. 3,620,584. The ferrofluid or the magnetic liquid, which may have an aqueous, hydrocarbon or other liquid carrier, and typically comprises a non-volatile carrier, is retained under each particular stage by the magnetic flux lines and forms a ferrofluid O-ring about the surface of the shaft. The low vapor pressure of the ferrofluid usually ensures a long maintenance-free seal life.

It is desirable, particularly in computer-disc-drive spindle applications and in similar applications, to provide an improved ferrofluid exclusion seal operation and exclusion seal system of simple design, low cost and small space requirements.

SUMMARY OF THE INVENTION

The invention relates to a single-pole-piece ferrofluid exclusion seal, a ferrofluid exclusion seal system in which the exclusion seal is employed, and a method of sealing a rotatable shaft. In particular, the invention concerns a single-pole-piece ferrofluid exclusion seal apparatus and its use in combination with rotatable shafts of small design and high speeds.

A single-pole-piece ferrofluid seal apparatus has been found to be an effective solution for an improved low-pressure capacity, low-cost, simple ferrofluid exclusion seal, particularly for use with small-diameter, high-speed shaft elements, such as found in computer-disc drives, textile drive spindles, motors and the like. The single-pole-piece ferrofluid seal apparatus of the invention consists of a single magnetically permeable pole piece, instead of the employment of two spaced-apart magnetically permeable pole pieces of the prior art, with the single pole piece at one end in a magnetic-flux relationship with a permanent magnet, and with the other end extending into a close, noncontacting relationship with the surface of the shaft element to be sealed, to define a small radial gap therebetween, and ferrofluid retained in the gap to provide the ferrofluid seal.

The single pole piece is secured, such as by bonding, staking or other means, to the permanent magnet. The overall width of the single-stage pole piece is smaller than that for a conventional two-pole-piece seal, and, furthermore, the assembly of the seal is considerably simplified, as its design makes the single pole piece very cost-effective. In the absence of another pole piece, the single-pole-piece ferrofluid seal apparatus provides for a single radial gap between the end of one pole piece and the magnetically permeable shaft element used, so that the magnetic-flux density produced in the radial gap, in such a single-pole-piece seal, is very small compared with that of the prior-art two magnetic pole-piece seals. The magnetic-flux path of the single pole piece then proceeds through the one end of the permanent magnet, the single pole piece, the ferrofluid and a magnetically permeable shaft and through the air to the other end of the magnet. In a single-pole-piece exclusion seal, due to the weak magnetic flux density through the radial gap, it is often desirable to employ a higher-than-usual magnetization ferrofluid, in order to provide a sufficient safety margin of retention of the ferrofluid beneath the radial gap of the single pole piece, to protect against ferrofluid splash which may be occasioned by the centrifugal forces developed by the rotatable shaft to be sealed.

The pressure capacity of a ferrofluid seal apparatus per ferrofluid stage is given by the formula $\Delta P = 1.17 \times 10^{-6}$ $Ms$ $H$ psi, wherein P is the pressure capacity in psi, Ms equals the saturation magnetization of the ferrofluid in gauss, and H is equal to the magnetic-flux density in the radial gap between the one end of the pole piece and the magnetically permeable shaft in oersteds. Thus, in a low-pressure-capacity ferrofluid single-pole-piece seal, the values of Ms or H need not be high, while, alternatively, the same result can be obtained by selecting a combination of high values for the fluid saturation magnetization of the ferrofluid and a low value of H for the flux density in the gap, or vice versa. The two parameters employed (Ms and H) cannot be decreased arbitrarily, since the ferrofluid must be magnetically retained in the radial gap against centrifugal forces developed by the rotating shaft element. It has been found that the necessary condition for the ferrofluid retention within the gap during a sealing process is fm>fc, where fm is equal to the magnetic force density on the ferrofluid employed and fc is equal to the centrifugal-force density on the ferrofluid. Thus, in those applications where the rotatable-shaft diameter is small, or, alternatively, for a large-shaft diameter, the speed of rotation is small and the value of fc (the centrifugal force) would be small. A ferrofluid exclusion seal thus is designed to have a low value of flux density in the air gap and a high magnetization ferrofluid in the radial gap, in order to satisfy the condition of fm>vc.

While prior-art dual pole-piece ferrofluid exclusion seals are effective, and may be applicable for many low-pressure-capacity applications, there are some applications wherein the space and cost objectives prevent or prohibit the employment of such prior-art ferrofluid seals. It has been discovered that the recent trend in the computer-disc-drive industry to the employment of smaller computer spindles, such as from 5¼ inches and 3¼ inches or lower in diameter, the compactness of the spindle employed leaves very little space for the employment of a conventional, dual, pole-piece ferrofluid exclusion seal. The reduction in diameter of spindles; that is, spindles having a diameter less than, for example, 5¼ inches, and high speeds, such as speeds of 3600 rpm or higher, yield very small centrifugal forces on the ferrofluid employed in the seal. It has been discovered in such applications that such single-pole-piece ferrofluid seal apparatus of simple design, low cost and easily assembled are effective, provided that the seal is designed to retain the ferrofluid within the radial gap at such high speeds, and the values are selected to overcome the reduction in flux density in the air gap between the permanent magnet and the single pole piece.

The invention will be described for the purpose of illustration only in connection with certain embodiments; however, it is recognized that various changes and modifications may be made to the embodiment as described, all falling within the spirit and scope of the invention.

DESCRIPTION OF THE EMBODIMENTS

Figure 1:
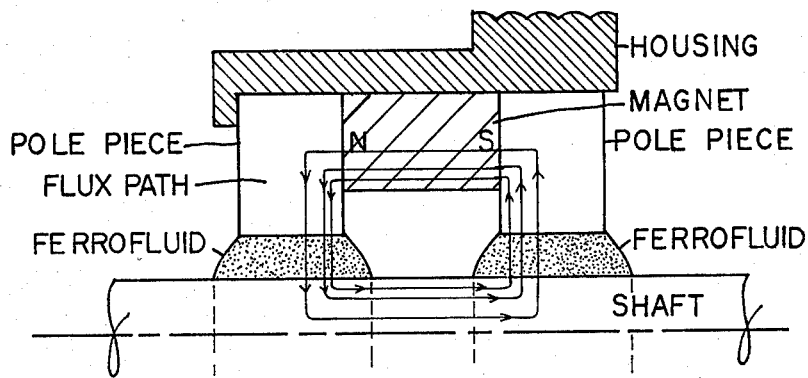
FIG. 1 is a schematic, sectional illustration of a prior-art dual pole-piece ferrofluid exclusion seal.

FIG. 1 shows a prior-art ferrofluid exclusion seal composed of first and second magnetically permeable pole pieces, which prior-art exclusion seal is applicable for use for most low-pressure-capacity sealing applications. In the exclusion seal of FIG. 1, the magnetic-flux path is shown as passing from the magnet through the pole pieces and through the ferrofluid in each of the radial gaps and through the shaft, with the flux density relatively uniformly disposed in the magnetic-flux circuit.

Figure 2:
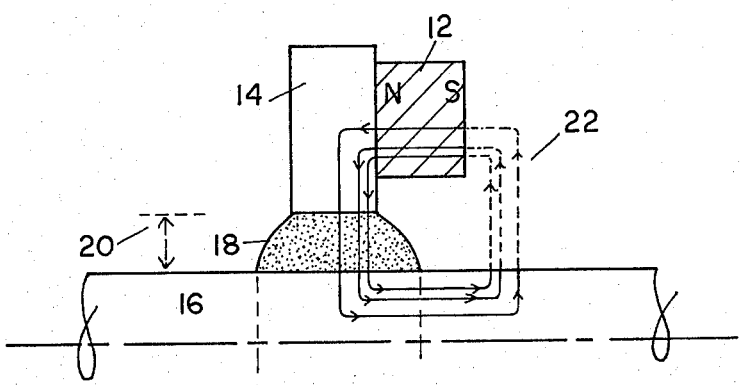
FIG. 2 is a schematic illustration of a single-pole-piece exclusion seal of the invention.

FIG. 2 is a schematic illustration of the single-pole-piece ferrofluid seal apparatus 10 of the invention, which includes an annular permanent magnet 12 and a single, magnetic, permeable pole piece 14 secured to one side of the permanent magnet 12, one end of the pole piece extending into a close, noncontacting relationship with the surface of a rotatable shaft 16 to be sealed, and defining a radial gap 20 filled with a magnetic liquid 18, such as a nonvolatile ferrofluid. The seal apparatus 10 provides an air gap 24 between the magnet 12 and the permeable shaft 16. The magnetic-flux path is schematically illustrated as extending through the air gap 24, the magnet 12, the pole piece 14, the ferrofluid 18 and the shaft 16.

The seal apparatus 10 of FIG. 2 is a single-pole-piece ferrofluid seal. The pole piece 14 may be made of any magnetically permeable material, such as a 400-series stainless-steel material. The thickness of the pole piece may vary and typically may range from about 15 to 100 mils in thickness, while the radial gap 20 is often smaller than the radial gap employed in the FIG. 1 prior-art seal and may range, for example, from about 2 to 10 mils, depending upon the desired performance objectives of the seal apparatus. The pole piece 14 is secured to one side or one pole of the annular permanent magnet 12 by a variety of techniques. For example, the pole piece 14 may be bonded rigidly to the magnet side with a high-strength adhesive or be staked directly, or by other securing means. The pole piece extends about the rotatable shaft 16, and FIG. 2 is a representation of only a one-half sectional, partial view of the single-pole-piece seal of the invention. The seal apparatus is cost-effective in that the assembly of the seal is simply designed, easily manufactured, and the space requirements are such that the seal may be employed readily where space is at a premium, and particularly where the shaft 16 comprises a small-diameter, high-speed shaft, such as a computer-disc-drive shaft. The magnetic-flux density in the magnetic-flux path produced in the air gap in the single pole piece 10 is quite small, compared with the flux density as illustrated in the prior-art seal of FIG. 1.

Since the magnetic-flux circuit is not complete, as in the prior-art seal, it is desirable to employ a high-magnetization ferrofluid, to provide a safety margin against ferrofluid splash by centrifugal forces of the rotatable shaft. Often, high-magnetization ferrofluids yield poor extended seal life, unless the ferrofluid carrier evaporation is quite small. Thus, the ferrofluids employed should have a relatively nonvolatile liquid carrier which provides for very low fluid evaporation from the ferrofluid, such as the employment of silicone oil or polyphenyl liquid carriers or other nonvolatile organic carriers. The use of a high-magnetization ferrofluid and a low-viscosity fluid, such as less than 200 cps, provides a very reliable, single-pole seal. Suitable ferrofluids for use in the seal apparatus of the invention would comprise ferrofluids having, for example, 200 to 500 gauss or more at a viscosity of 200 cps, and particularly, for example, a ferrofluid having a magnetization of from 300 to 400 gauss at a viscosity of 200 to 350 cps. Thus, by employing a small radial gap, with a high-magnetization ferrofluid, and the use of a nonvolatile ferrofluid, the small magnetic-flux density in the air gap can be overcome, to provide a reliable single-pole-piece ferrofluid seal apparatus.

Figure 3:
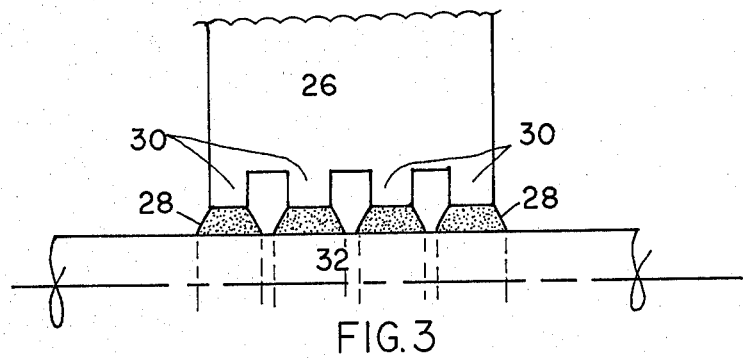
FIG. 3 is an enlarged fragmentary view of a pole piece, showing a multiple-stage, single-pole-piece ferrofluid exclusion seal of the invention.

FIG. 3 is a schematic illustration of an enlarged fragmentary view of a single pole piece, in combination with a shaft. FIG. 3 shows a single pole piece 26 secured to an annular permanent magnet (not shown), one end of the pole piece having a plurality of ridges 30 thereon, to define, with the permeable rotatable shaft 32, a plurality of ferrofluid seals 28, or to define a multiple-stage seal. Thus, while FIG. 2 is directed to a single-pole, single-stage ferrofluid magnetic seal apparatus, FIG. 3 illustrates a multiple-stage, single-pole ferrofluid seal apparatus, wherein it is desired not only to provide an exclusion seal, but an exclusion seal with some pressure capacity.

What is claimed is:

1. A single-pole-piece ferrofluid seal apparatus which consists essentially of:
   (a) a single magnetically permeable pole piece to surround a shaft element which is to be sealed, the pole piece having a one end and another end and one and another surface;

(b) a permanent magnet having a one and another end and one and another surface;

(c) means to secure the one end of one surface of the permanent magnet to the one end of the one surface of the single pole piece, to place the single pole piece in a close, magnetic-flux relationship with one end of the permanent magnet;

(d) the other end of the pole piece extending into a close, noncontacting relationship with the surface of the shaft to be sealed, to define a small radial gap between the surface of the shaft and the other end of the pole piece of defined dimensions;

(e) the permanent magnet and the single pole piece providing a magnetic flux path through the permanent magnet, the single pole piece, the ferrofluid in the radial gap, the shaft element to be sealed, and an air gap between the shaft element and the other end of the permanent magnet; and (f) a ferrofluid disposed in the radial gap, to provide a ferrofluid seal with the surface of the shaft element, the ferrofluid characterized by a magnetization value in oersteds, and a magnetic-flux density in the radial gap sufficient to provide a magnetic-force density on the ferrofluid which is greater than the centrifugal-force density of the rotatable shaft element on the ferrofluid, to retain the ferrofluid in a seal position.

2. The seal apparatus of claim 1 wherein the radial gap ranges from about 2 to 10 mils.

3. The seal apparatus of claim 1 wherein the thickness of the single pole piece ranges from about 15 to 100 mils.

4. The seal apparatus of claim 1 wherein the single pole piece is composed of a 400-series stainless-steel metal.

5. The seal apparatus of claim 1 wherein the ferrofluid has a magnetization of from about 200 to 500 gauss.

6. The seal apparatus of claim 1 wherein the ferrofluid is characterized by a viscosity ranging from about 200 to 350 cps at from about 300 to 400 gauss.

7. The seal apparatus of claim 1 wherein the one surface of the permanent magnet is adhesively bonded to the one surface of the single pole piece.

8. The seal apparatus of claim 1 which includes a rotatable magnetically permeable shaft element, to provide a ferrofluid exclusion seal system.

9. The exclusion seal system of claim 8 wherein the rotatable shaft element comprises a computer-disc-drive spindle having a diameter of about 5¼ inches or less and a speed of about 3600 rpm or greater.

10. The seal apparatus of claim 1 wherein the other end of the single pole piece or the surface of the shaft element adjacent the other end of the pole piece comprises a series of ridges, so as to form a plurality of ferrofluid-sealing stages between the other end of the single single pole piece and the surface of the shaft element, to provide a ferrofluid seal apparatus having a defined pressure capacity.

11. A method of providing a ferrofluid exclusion seal about a rotatable shaft element, which method comprises:

(a) surrounding the rotatable shaft with an annular, single pole piece of magnetically permeable material having a one and other end, the one end of the pole piece secured in a magnetic-flux relationship to one end of an annular permanent magnet having a one and other end, the other end of the single pole piece extending into a close, noncontacting relationship with the surface of the shaft to define a small radial gap;

(b) sealing the shaft by employing a ferrofluid in the radial gap, the ferrofluid characterized by a magnetization value in oersteds, and a magnetic-flux density in the radial gap sufficient to provide a magnetic-force density on the ferrofluid which is greater than the centrifugal-force density of the rotatable shaft element on the ferrofluid, to retain the ferrofluid in a seal position; and (c) providing a magnetic flux path through the permanent magnet, the single pole piece, the ferrofluid in the radial gap, the shaft, and an air gap between the shaft and the other end of the permanent magnet.

12. The method of claim 11 which includes providing a radial gap which is shorter in length than the air gap.

13. The method of claim 11 which includes forming a plurality of O-ring ferrofluid sealing stages in the radial gap beneath the one end of the single pole piece to provide a shaft seal of defined pressure capacity.

* * * * *